(12) United States Patent
Ferrante

(10) Patent No.: US 7,501,943 B1
(45) Date of Patent: Mar. 10, 2009

(54) RADIO FREQUENCY ID CODING FOR IDENTIFYING MULTIPLE ITEMS OF THE SAME TYPE

(75) Inventor: John G. Ferrante, Wilmington, DE (US)

(73) Assignee: Lockheed Martin Corporation, Bethesda, MD (US)

( * ) Notice: Subject to any disclaimer, the term of this patent is extended or adjusted under 35 U.S.C. 154(b) by 953 days.

(21) Appl. No.: 10/851,822

(22) Filed: May 21, 2004

(51) Int. Cl.
*G08B 19/00* (2006.01)
*G08B 13/14* (2006.01)
*H04Q 5/22* (2006.01)

(52) U.S. Cl. .................. 340/522; 340/10.1; 340/572.1; 340/572.2

(58) Field of Classification Search .......... 340/522, 340/531, 686.6, 10.1, 572.1, 572.2, 825.54; 235/436; 342/42, 44
See application file for complete search history.

(56) References Cited

U.S. PATENT DOCUMENTS

| | | | | |
|---|---|---|---|---|
| 4,069,472 A | * | 1/1978 | Kamata et al. ................. | 342/44 |
| 5,291,205 A | * | 3/1994 | Greene ......................... | 342/44 |
| 5,446,447 A | * | 8/1995 | Carney et al. ............. | 340/572.4 |
| 5,680,106 A | * | 10/1997 | Schrott et al. ............. | 340/10.33 |
| 6,346,884 B1 | * | 2/2002 | Uozumi et al. ........... | 340/572.1 |
| 6,617,962 B1 | * | 9/2003 | Horwitz et al. ............ | 340/10.4 |
| 6,819,222 B2 | * | 11/2004 | Lin et al. .................. | 340/10.31 |
| 7,193,504 B2 | * | 3/2007 | Carrender et al. .......... | 340/10.4 |

* cited by examiner

Primary Examiner—Brian A Zimmerman
Assistant Examiner—Nam V Nguyen
(74) Attorney, Agent, or Firm—Duane Morris LLP

(57) ABSTRACT

An RFID tag includes taggents which reflect at selected frequencies or tones. For each byte of information to be associated with an item to be tagged, a reflective tone range is assigned. Within the tone range of each byte, a bit is represented by a subband range, where a reflective tone in any subband range represents a logic 1 state of that bit. To represent a bit, one of the reflective tones in the subband is randomly chosen. The data carried by the tag may include checksum information carried in further tone range. The randomly assigned subband selected for each item(s) is recorded, and the recorded information accompanies a group of tagged items. Reading tagged items involves tone scanning the tags and using the resulting reflective tones and the recorded information to determine which items are present.

7 Claims, 3 Drawing Sheets

RADIO FREQUENCY ID CODING FOR IDENTIFYING MULTIPLE ITEMS OF THE SAME TYPE

FIELD OF THE INVENTION

This invention relates to radio-frequency identification (RFID) tags, and more particularly to a coding arrangement which allow identification of multiple tagged items of the same kind among a group of tagged items.

BACKGROUND OF THE INVENTION

Radio-Frequency Identification (RFID) tags have received substantial attention because of their potential for allowing inventory control or checkout scanning without the need for separate scanning of each tagged article or item in a group of items. Tagging allows an item to be associated with relevant information such as nature of the item, price, serial number, expiration date, andor shipping date. Among the problems which have confronted designers has been the need to report or respond with a plurality of bits when interrogated. In general, this requires some sort of memory in which the bits representing the item with which the tag is associated are stored. This requirement, in turn, requires either a nonvolatile memory or a volatile memory in conjunction with a power source. In the case of a volatile memory with a battery power source, the tag undesirably loses its information if the battery should fail. If a nonvolatile memory is used, the reading of the nonvolatile memory can itself require power, so some internal or external source of energy must be provided, which undesirably increases the cost of the tags. Some RFID tags are active, but do not require an on-board power source, as they are energized by the interrogating electromagnetic wave. However, the power level of the radiated electromagnetic field required for such activation may undesirably interfere with other radio-frequency devices such as communications and control devices in the region. Thus, the interrogating radio-frequency field should be of low amplitude, which in general is not compatible with the powering of an active RFID tag.

Those skilled in the art know that the term "radio frequency" originally referred to frequencies which are within the range now known as Very Low Frequency (VLF), ranging from about 3 to 30 KHz. With the advent of broadcast services in the frequency range of 540 to 1600 KHz, the term came to include such frequencies. With the passage of time and the expansion of the range of usable frequencies of electromagnetic radiation the term has come to relatively broadly encompass all frequencies of electromagnetic radiation below light frequencies.

Inkode Corporation, whose United States address is Inkode USA, 8230 Old Courthouse Road, Vienna, Va. 22182 has for some years licensed the manufacture of low-cost RFID tags to manufacturers, such as Lintec Corporation. These tags include reflective antenna-like elements with dimensions as small as 250 angstroms (Å) imbedded in the dielectric material of the tag. In one version, the reflective elements, termed "taggents," are contained within an ink which is applied to the tag. Each of the reflective elements reflects electromagnetic energy at a frequency related to its dimensions. Multiple reflective elements imbedded in a tag can result in a spectral response which is different from the spectral responses of other tags having reflective elements of different lengths.

One of the advantages of the reflective RFID tags licensed by Inkode is that they are inexpensive, and can respond to an interrogating signal from a significant distance, which may be as great as 40 feet at the current state of the art. In addition, RFID tags are desirable in that the radio-frequency interrogating electromagnetic energy, and the reflective responses thereto, can pass through dielectric materials and through some regions which include both dielectric and electrically conductive materials. As a result of these features, an electromagnetic "scanner" corresponding to a bar-code scanner at a checkout counter would not necessarily have to have a direct view of a tagged item in order to detect its presence. This, in turn, could result in a checkout procedure in which a cart, of goods is wheeled up to the checkout counter, and the items in the cart are "immediately" identified without removal or discrete scanning. The saving in checkout time and the reduction in clerk activity could be very beneficial in such situations.

Improved RFID tags and consequent improved checkout and inventory procedures are desired.

SUMMARY OF THE INVENTION

A method according to an aspect of the invention is for tagging plural items with information related to the items. The method includes, for each item to which information is to be appended, the step of selecting a plurality of reflective tone ranges, where each of the tone ranges represents a particular byte of data to be associated with the item. The bit value of a byte is represented by the particular reflective tone within the tone range. In addition, a further reflective tone band is selected, which represents a checksum tone range. For each item to which information is to be appended, a reflective tone within each of the selected reflective tone ranges is randomly selected. A checksum of the randomly selected reflective tones is generated for each item to which information is to be appended. A tone-reflective tag is prepared, with the tag including reflective elements which are electromagnetically reflective at the selected tones, including the checksum tone. The tag is associated with the corresponding item to thereby produce a tagged item. At least the randomly selected reflective tones, the checksum, and their association with the corresponding item are recorded, to thereby produce recorded information. The recorded information is associated with the tagged item, and preferably with a plurality of tagged items.

In a preferred method for inventory control of RFID tagged articles or items, the tag is illuminated with electromagnetic radiation at least the selected tones, and reflections are received from the tag in response to the illumination. The reflections are processed in conjunction with the recorded information by generating a checksum from the bytes of information and comparing the reflected tones and the checksum with the recorded information to thereby identify the tagged item.

A method for identifying articles within a field according to another aspect of the invention comprises the steps of associating with each item a tag carrying a frequency-selective electromagnetically reflective material, which reflective material reflects preferentially at least one selected reflective frequency, within a subband, which reflection in a subband represents a byte of information relating to the tagged item. Electromagnetic radiation is directed toward the tag at a plurality of frequencies, at least one frequency of which corresponds with the one selected frequency, so as to generate reflected electromagnetic energy. The frequency of the reflected electromagnetic energy is compared with a table correlating frequency with information, to determine the byte of information for each of the tags. In one advantageous version of this mode of the method, the step of directing toward the tag includes the step of one of incrementing and decrementing frequency to sequentially direct the plurality of frequencies toward the tag. In another advantageous embodiment, the step of associating with each item a tag includes the step of randomizing each of the reflective tones in a known manner. The known manner may be recorded, and the step of comparing the frequency of the reflected electromagnetic energy with a table correlating frequency with information includes the step of comparing the frequency of the reflected electromagnetic energy with the recorded information, to extract the byte of information.

DESCRIPTION OF THE INVENTION

A desirable attribute of a supermarket cart checkout system is that it uniquely identify all the items in the cart and correctly ascribe to each item the relevant attributes. One problem which occurs in prior art RFID tag situations is that which arises when a customer places a plurality of items of the same type in his cart, together with a variety of other items. For example, a shopping cart might contain, among other things, several cans of beans. If each can of beans has an RFID tag, the tags respond simultaneously to each attempt to read, and the scanner may have difficulty in determining that there is more than one can of beans in the cart.

Figure 1:
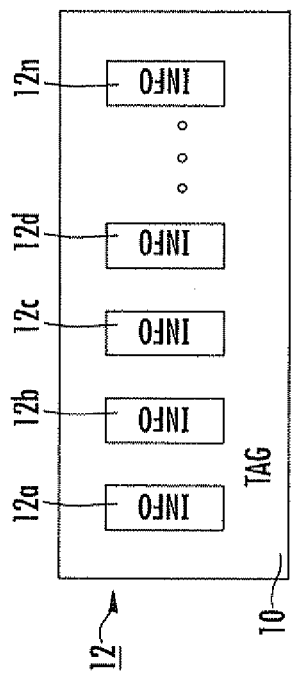
FIG. 1 is a simplified representation of a frequency- or tone-sensitive RFID tag according to an aspect of the invention, showing various individual regions, each of which may represent a byte of information or a checksum, so that the tag as a whole carries a plurality of bytes of information, one or more of which may be a checksum.

FIG. 1 is a simplified representation of a card, tag, or applique 10 which may be associated with an article or item (not illustrated). Tag 10 includes a set 12 of plural regions 12a, 12b, 12c, 12d, . . . , 12n which represent regions which are made electromagnetically reflective at one or more frequencies or tones. One way to make the regions 12 electromagnetically reflective is to print the regions with ink containing electrically conductive taggents (wires or antennas), as licensed by Inkode Corporation. These taggents can, in theory, be of any desired length, so as to respond at any selected frequency. In practice, the limitations imposed by practical dimensions of a tag for an article limit the maximum dimensions of the taggents, and regulatory limitations make some potentially useful frequency ranges unavailable. The resonant frequencies or reflective tones of taggents used by Inkode, according to their literature, occur in the range of 24 to 25 GHz or 60 to 66 GHz. Of course, other frequency ranges may be used if available and have resonators of practical dimensions.

According to an aspect of the invention, a coding scheme is used to uniquely identify each item and its attendant information package among multiple simultaneous reads of the items and their tags or appliques. This coding scheme uses specific, separate frequency ranges, bands or tones for each category of information to be carried. For example, physical region 12a of tag 10 of FIG. 1 might carry a first category of information, such as item identification, in a first frequency subband; physical region 12b might carry a second category of information, such as price, in a second frequency subband different from the first subband; region 12c might carry a third item of information, such as expiration date, in a third frequency subband different from the first and second subbands; region 12d might carry a fourth category of information, such as serial or batch number, in a fourth frequency subband; . . . , and other regions might carry other information in other frequency subbands. It should be noted that the physical separation of the various regions 12a, 12b, 12c, . . . , 12n illustrated in FIG. 1 is not mandatory to the invention, but is merely used to aid in illustrating the concepts. Thus, an electromagnetic tone or frequency reflected by a taggent within the frequency range or subband relating to a category of information is deemed to represent information pertaining to the category of information, whether reflected by a unique portion of a tag or by the tag as a whole.

Figure 2:
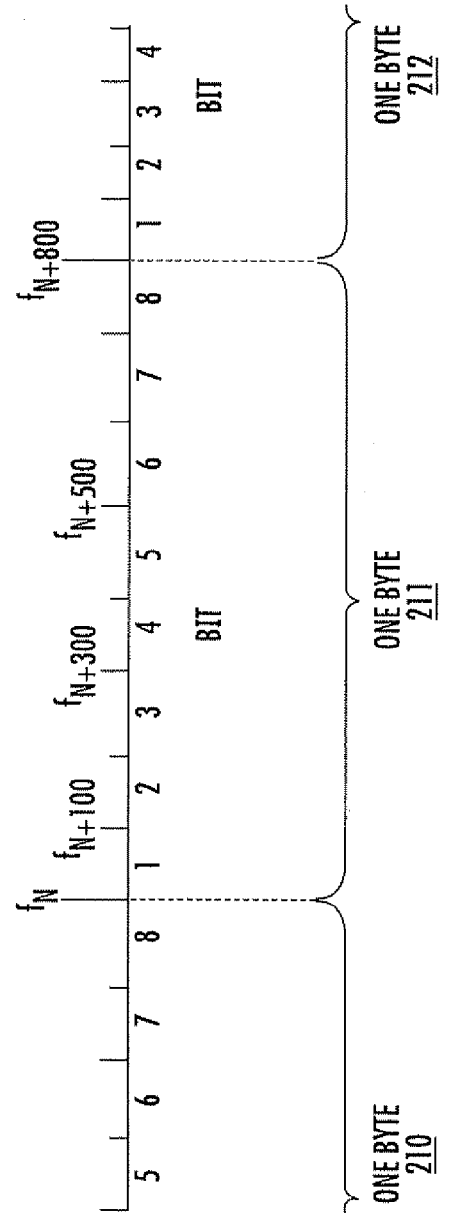
FIG. 2 illustrates a portion of an example of a frequency spectrum or tone range according to an aspect of the invention, which may be used to carry bits and bytes of information in the RFID tag of FIG. 1.

Within each frequency subband pertaining to a category, each bit of information occupies a known bandwidth, with the ratio of the bandwidth of a bit to the total bandwidth of the frequency subband in which it occurs representing the total number of bits which can occupy the subband. FIG. 2 illustrates a complete 8-bit or one-byte frequency subband 211 and portions of two adjacent subbands 210 and 212. These byte numbers are selected to aid in identifying the elements of the FIGURE, and not to represent any limitation on the number of bytes in the particular example. Byte 211 of FIG. 2 extends from an arbitrarily selected frequency designated $f_N$ (Hz is implied) to a higher frequency designated $f_{N+800}$. In this particular example, each of the eight bits, numbered 1 to 8, within byte 211 occupies a bandwidth of 100 Hz, so the eight bits of byte 211 occupy, in total, 800 Hz. Thus, bit number 1 of byte 211 of FIG. 2 occupies the frequency range extending from N Hz to N+100 Hz, bit number 2 occupies the frequency range extending from N+100 Hz to N+200 Hz, bit number 3 occupies a frequency range extending from N+200 Hz to N+300 Hz, bit number 4 occupies a frequency range extending from N+300 Hz to N+400 Hz, bit number 5 occupies a frequency range extending from N+400 Hz to N+500 Hz, bit number 6 occupies a frequency range extending from N+500 Hz to N+600 Hz, bit number 7 occupies a frequency range extending from N+600 Hz to N+700 Hz, and bit number 8 occupies a frequency range extending from N+700 Hz to N+800 Hz. Thus, a reflected tone from a taggent, which tone lies within the frequency range of an identified bit in FIG. 2 represents a logic one (1) or HIGH condition or state of that particular bit of the byte in which its frequency lies. Lack of a reflected tone from a taggent at a frequency which lies within the frequency range of a bit of the byte indicates a logic zero (0) or logic LOW condition or state of that particular bit.

Figure 3:
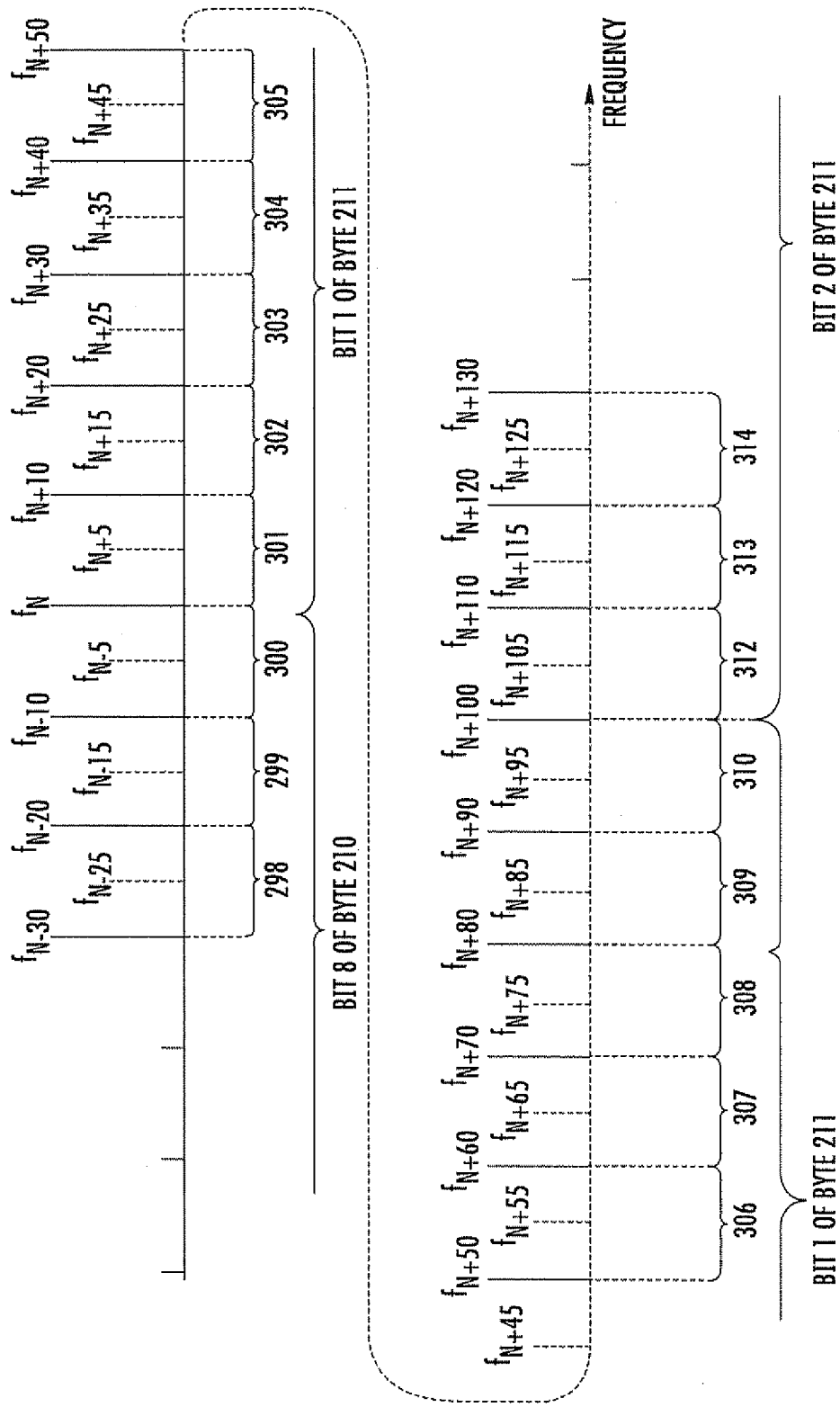
FIG. 3 illustrates a portion of the frequency spectrum or tone range of FIG. 2 according to another aspect of the invention, showing that the frequency range for each bit of information includes frequency subbands, any one of which by a logic HIGH state may represent a logic HIGH state of the bit.

In one embodiment of the invention, the resolvable bandwidth is deemed to be 10 Hz. That is to say, any of ten different or individual frequencies can be identified within the 100 Hz bandwidth of any particular bit in the example of FIG. 2. Thus, any of ten separate frequencies located within bit 1 of byte 211 of FIG. 2 can be resolved, and when present and so resolved, is deemed to represent a logic 1 condition of bit 1 of byte 211. FIG. 3 represents a portion of the frequency spectrum of FIG. 2, including the first bit (bit 1) of byte 211, and portions of bit 2 of byte 211 and bit 8 of byte 210. In FIG. 3, the frequencies representing the first byte 211 bit 1 first subband 301 are seen to extend from frequency $f_N$ to $f_{N+10}$, with a center at $f_{N+5}$. The frequency representing the byte 211 bit 1 second subband 302 is seen to extend from frequency $F_{N+10}$ to $F_{N+20}$ with a center at $F_{N+15}$, and the byte 211 bit 1 third subband 303 is seen to extend from $F_{N+20}$ to $F_{N+30}$, with a center at $F_{N+25}$. The frequency representing the byte 211 bit 1 fourth subband 304 is seen to extend from frequency $F_{N+30}$ to $F_{N+40}$ with a center at $F_{N+35}$, and the byte 211 bit 1 fifth subband 305 is seen to extend from $F_{N+40}$ to $F_{N+50}$, with a center at $F_{N+45}$. The frequency representing the byte 211 bit 1 sixth subband 306 is seen to extend from frequency $F_{N+50}$ to $F_{N+60}$ with a center at $F_{N+55}$, and the byte 211 bit 1 seventh subband 307 is seen to extend from $F_{N+60}$ to $F_{N+70}$, with a center at $F_{N+65}$. The frequency representing the byte 211 bit 1 eighth subband 308 is seen to extend from frequency $F_{N+70}$ to $F_{N+80}$ with a center at $F_{N+75}$, and the byte 211 bit 1 ninth subband 309 is seen to extend from $F_{N+80}$ to $F_{N+90}$, with a center at $F_{N+85}$. Finally, the byte 211 bit 1 tenth subband 310 is seen to extend from frequency $F_{N+90}$ to $F_{N+100}$ with a center at $F_{N+95}$. The presence of a reflected tone from a taggent at any one of ten frequencies $f_{N+5}$, $f_{N+15}$, $f_{N+25}$, $f_{N+35}$, fN+45, $f_{N+55}$, $f_{N+65}$, $f_{N+75}$, $f_{N+85}$, and $f_{N+95}$ Hz is interpreted as representing a logic 1 condition of bit 1 of byte 211. Similarly, any of ten separate frequencies $f_{N+105}$, $f_{N+115}$, $f_{N+125}$, . . . located within bit 2 of byte 211 of FIG. 3 can be resolved, and when present and so resolved, is deemed to represent a logic 1 condition of bit 2 of byte 211. Any of ten separate frequencies $f_{N-5}$, $f_{N-15}$, $f_{N-25}$, . . . of byte 210 of FIG. 3 can be resolved, and when present and so resolved, is deemed to represent a logic 1 condition of bit 210. Thus, the presence of a reflected tone from a taggent at any of ten frequencies fN+105, fN+115, fN+125, fN+135, fN+145, fN+155, fN+165, fN+175, fN+185, and fN+195 Hz is interpreted as representing a logic 1 condition of bit 2 of byte 211. This pattern also applies to bits 3, 4, 5, 6, and 7 of byte 211. Finally, any of ten separate frequencies located within bit 8 of byte 211 of FIG. 2 can be resolved, and when present and so resolved, is deemed to represent a logic 1 condition of bit 8 of byte 211. Thus, the presence of a reflected tone from a taggent at any of ten frequencies (not illustrated) $f_{N+705}$, $f_{N+715}$, $f_{N+725}$, $f_{N+735}$, $f_{N+745}$, $f_{N+755}$, $f_{N+765}$, $f_{N+775}$, $f_{N+785}$, and $f_{N+795}$ Hz is interpreted as representing a logic 1 condition of bit 8 of byte 211 of FIG. 2. Naturally, the same kind of interpretation can be applied to the bits of adjacent bytes 210 and 212, and more generally to all bits of all bytes associated with the tag. While the example uses ten resolvable frequencies for each bit, more or fewer frequencies may be used. Depending upon the application of to which a tag generating and reading system according to an aspect of the invention is put, the resolvable bandwidth may be greater than 10 Hz. At the present state of the art, resolution of signals which are mutually adjacent in the frequency domain above about 1 GHz and having a frequency separation of less than about 10 Hz is not economical, but if such resolution were available, it could of course be used to increase the number of frequencies which might be used to represent each bit of information. This increase in the number of available bits could be taken advantage of, were it available, to make it possible to simultaneously multiple-scan a larger number of items of the same type.

The logic state of any bit of a byte of a tag such as tag 10 of FIG. 1 can be represented by the presence or absence of any of a plurality of tones or frequencies of electromagnetic radiation reflected (or not reflected, as the case may be) from the taggents of a tag according to the invention, when interrogated by an electromagnetic signal source. Such sources are known. One type of source of a broad band of electromagnetic radiation is known as a swept-frequency source, sweep oscillator, or sweep generator. Such a generator generates all the interrogation frequencies of interest as a continuous radiated signal of monotonically increasing or decreasing frequency. The sweep generator may also be digital, in which case the frequency increments or decrements by discrete steps rather than continuously. In the case of a digital sweep generator for the example, 10 Hz frequency increments would be useful. As an alternative to a sweep generator, an impulse generator can simultaneously generate a broad band of frequencies, which can be frequency filtered to remove those frequencies which are not of interest for interrogation of a tag or set of tags. While the scanning by means of a sweep generator requires a finite time, that time is short on a human time scale and is deemed to be a simultaneous reading of all the items in the group being inventoried or checked out.

Cans of beans are not typically serial-numbered, and are ordinarily identified by no more than batch number. Thus, in the situation of a simple prior art tagging scheme, the tag of each can of beans would bear the same markings as the tags of other cans of beans, at least within each batch, which might be of hundreds or thousands of cans. The presence of multiple cans of beans in a shopper's cart would result, in the absence of random padding, in reading the same information from the tag of each can. For a simultaneous multiple scan, all of the cans of beans would produce the same reflective tone response, which, if the multiple reflections did not mutually interfere, would be interpreted as representing the presence of a single can of beans. If mutual interference were to occur, the scanning might result in failure to recognize even the one can of beans, or in a misidentification. According to an aspect of the invention, random padding of the bit subbands is used to make the data representation among the subbands "unique" to the extent possible given the number of available bit subbands. More specifically, take as an example the generating of tags for cans of beans. The random padding within each bit randomly assigns the reflection to one of the ten frequency or tone ranges (301 through 310 in the example of FIG. 3) which characterizes a bit. Thus, if the state to be assigned to the tag for bit 1 of byte 211 of FIG. 2 is a logic 1, one of the ten frequencies or tones $f_{N+5}$, $f_{N+15}$, $f_{N+25}$, $f_{N+35}$, $f_{N+45}$, $f_{N+55}$, $f_{N+65}$, $f_{N+75}$, $f_{N+85}$, and $f_{N+95}$ Hz of FIG. 3 is randomly selected to tag each can of beans. Thus, a likelihood exists that in a supermarket cart containing, say, two cans of beans, one of the cans will have reflected tone spectral response different from that of the other of the cans. The likelihood of two cans (or two of any item) in a cart having the same spectral response is determined by the number of separate frequencies which are used to represent each bit of information, the number of items in the cart, and other factors. The greater the number of subbands which represent each bit, the greater the likelihood that two items will not present the same spectral signature.

Thus, for N items simultaneously scanned or read, N tones or bits per subband will be read. For the same type item, this tone might be the same, so a random pad is imparted to the individual subband portions of each bit as a random shift of from 0 to N subband portion, to enhance the probability of a unique reflected tone per bit per item. Thus, the normal or default frequency or reflective tone of a bit (in the absence of randomization) might be deemed to be the lowest frequency subband of the bit. In the case of the example of FIG. 3, such a convention would assign the default (non-randomized) frequency for bit 1 of byte 211 as subband 301. A randomization, then, would be represented by a "multiplier" or factor ranging from 1 to 10, which would move the randomized reflective tone to the corresponding subband. More particularly, if the base or unrandomized subband is 301 for bit 1 of byte 211 of FIG. 1, a "multiplier" value of 1 would correspond with a reflected tone or frequency N+05, a multiplier of 2 would correspond to a reflected tone at N+15, a multiplier of 3 would correspond to a reflected tone at N+25, a multiplier of 4 would correspond to a reflected tone at N+35, a multiplier of 5 would correspond to a reflected tone at N+45, a multiplier of 6 would correspond to a reflected tone at N+55, a multiplier of 7 would correspond to a reflected tone at N+65, a multiplier of 8 would correspond to a reflected tone at N+75, a multiplier of 9 would correspond to a reflected tone at N+85, and a multiplier of 10 would correspond with a reflected tone at N+95. Thus, the randomization may be viewed as being a randomization of reflection frequency within a bit value. Those skilled in the art will recognize that actual frequency multiplication is not used, as actual frequency multiplication of a 60 GHz signal by a factor of two or three would raise the 60 GHz frequency to a 120 or 180 GHz, which is outside the frequency ranges of interest. A more accurate term to describe the random padding might be "frequency incrementing by M(10 Hz), where M ranges from 1 to 10 in the example. A record is kept of the subband data plus the pad data or randomization multiplier in order to effectively decode the tag when read.

As mentioned, the bit information distributed among the subbands determines the value of a byte of information. The information to which the value of a byte pertains is determined by the type of information content of the byte, such as price, expiration date, and the like. In turn, the content of the byte can be established by noting the range of frequencies which it occupies. Thus, as a simple example, the frequency range of 60.0 to 61.1 GHz might be deemed to be occupied by price information, the frequency range of 60.1 to 60.2 GHz by expiration date information, and the like. The scanning, therefore, would be able to determine not only the value of a byte or bytes but also ascribe the value or values to the appropriate content. The ascribing might require that the frequency ranges which are used and their application content be available to the scanner. This information would be included in the recorded information associated with the generation of the tags, accompanies the items to the location at which they are RFID scanned.

According to an aspect of the invention, the tag also contains taggents which carry checksum information. The checksum is appended to the data content. The checksum information is encoded in the same manner as that described in conjunction with FIG. 3, namely by the use of multiple-subband bits of checksum bytes. The checksum may be the sum of all the random shifts in the subbands of data. For example, if bit 1 of byte 211 is shifted by 3 subbands from subband 301 to subband 303 of FIG. 3, the increment of the checksum including this bit would be +3, corresponding to 30 Hz. If bit 2 of byte 211 were shifted by 10 subbands, its contribution to the checksum would be +10, corresponding to 100 Hz. The maximum checksum contribution for a single eight-bit byte with 10 subbands per bit would be eight times ten, or 80, corresponding to 800 Hz. The checksum for multiple bytes of information are the sum of all randomization increments for all the bits of all the bytes of data.

The randomization may deem the unrandomized subband of a bit to be other than the first subband. For example, the unrandomized subband might be deemed to be subband 305 for bit 1 of byte 211 of FIG. 3, in which case the randomization would range from −4 to +5, corresponding to shifting of the subband from 305 to 301 and from 305 to 310, respectively. Any subband could be deemed to be the unrandomized subband, and corresponding interpretations of the meaning of the randomization, and the checksum value, would be performed.

The checksum value which is carried in the tag information represents the total frequency shift, as measured from the non-randomized value, of the tone representing each bit of each byte of the data carried by the tag, except the checksum value. Note that the total information or data may be carried or contained in several different frequency bands of the overall tag frequency band. These various different frequency bands may represent bytes, and within bytes the frequency subbands represent bits. Within each bit, the frequency sub-sub-bands (termed "subbands" elsewhere herein) represent the various possible locations for the reflected tone for representation of a given bit. For four separate bands of data per item, such as item type, code, price, and expiration date, a checksum can be appended to the information code. This checksum could result from the frequency shifts in the four bands, or several checksums could be used (two band checksums correlated with the sum of two checksums).

Figure 4:
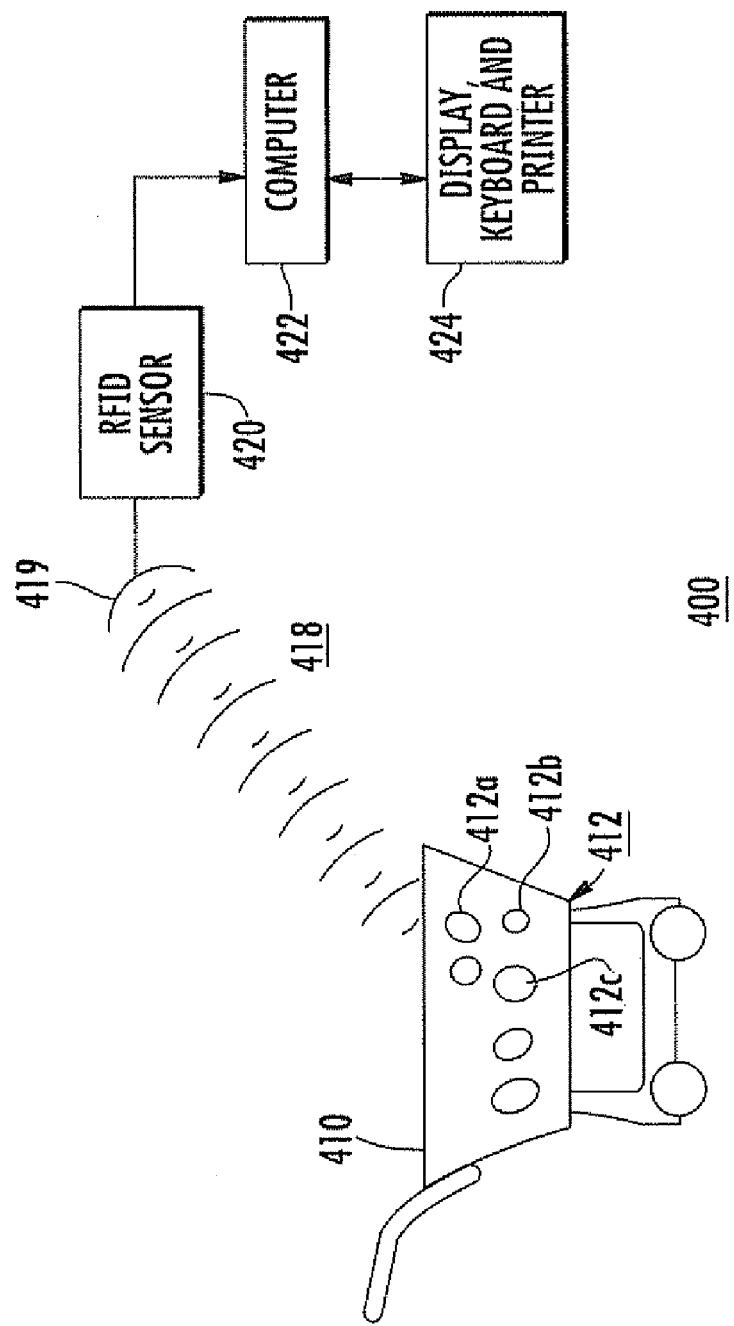
FIG. 4 is a simplified block diagram of a shopping cart containing a plurality of individual items tagged according to an aspect of the invention, and a checkout scanner including a radio-frequency sensor, a computer, and ancillary equipment.

FIG. 4 illustrates a supermarket checkout system 400. In FIG. 4, a cart 410 loaded with a mixture or set 412 of items 412a, 412b, 412c, ..., lies in the beam 418 of the antenna 419 of a Radio Frequency Identification (RFID) scanner, reader or sensor 420. RFID sensor 420 is coupled to a computer 422, which in turn is in communication with a display, keyboard or other entry device, and printer, illustrated together as a block 424, and it may also be coupled to other devices and to a local area network (not illustrated). In operation of the arrangement 400 of FIG. 4, electromagnetic radiation at all frequencies which might be used for RFID are transmitted from antenna 419 to the cart 410 to illuminate the tags associated with all the articles of set 412. The taggents of the tags reflect electromagnetic energy back to the antenna 419 at their respective frequencies or tones to thereby form a reflective response or reflected spectrum. As mentioned, this reading or interrogation occurs essentially simultaneously for all the items of set 412. When all the items of set 412 are tagged with information in this manner, an RFID reader must be able to read a group of items, read all the band, subband, and checksum tone data, and reconstruct the tag data for each included item, and make an inventory of the items found. This can then be used to determine the total price to the customer, offset inventory records of the supermarket, and print a sales receipt.

The sensor 420 and computer 422 of FIG. 4, which together may be termed a "reader," reconstructs the tag codes by first reading the checksum data, and forming all possible combinations of the information band data until a match to the checksum results. In a perfectly coded system, only one combination of tones should total for each checksum. When all matches of checksum with combinations of tones are attempted, all data is used once to correlate with all detected checksums. Errors can occur in this process when more than one combination of data correlates with a checksum.

As an example of an incorrect combination of data, assume that bit 1 of subband 1 is set and bit 4 of subband 2 is set, resulting in a checksum of five (5) stored in checksum subband 3. If another code consists of bit 4 of subband 1 set and bit 1 of subband 2 set, the resulting checksum stored in checksum band 3 would also equal five (5). Thus, the same checksum could correspond to two distinct sets of data (in this example, more in other possible examples). This could result in misreading of the coded data. This misassociation of subband data could occur because the subband data for code 1 can be mixed with the subband data with code 2 to for the same checksum, resulting in the nonexistent or ghost code 3. Also, the redundant checksum of five (5) would require sophisticated logic to detect the redundancies to maintain the proper number of decodes, or in other words to declare two item codes for the same checksum (disregarding the ghost code problem).

While it is possible to operate the tag in an RF absorptive mode rather than in an RF reflective mode, so that a logic 1 state is represented by a reflective null at the frequency in question, analysis shows that the signal-to-noise ratio of such an operating mode is inferior to that of the reflective mode. In such an operating condition, reflective taggents are required at the frequencies at which logic zero states are to be established, rather than those at which logic one states are required. This, in turn, leads to the need for a larger number of taggents to represent each bit, because instead of one taggent-bearing region out of ten, nine taggent-bearing regions would be required. Consequently, the cost might be greater than in the reflective case, and reliability might suffer.

Those skilled in the art recognize that the term "tag" as used herein may have the meaning of a printed pattern or applique on the tagged item, or a separate item affixed to the tagged item by adhesive, a string or other tension element, a band, or by any other method of physical association.

A method according to an aspect of the invention is for tagging plural items (412) with information related to the items (412). The method comprises the step of, for each item (412a, 412b, . . . ) to which information is to be appended, selecting a plurality of potentially reflective tone ranges ( . . . to $f_N$; $f_N$ to $f_{N+800}$; $f_{N+800}$ . . . ), each of which tone ranges ( . . . to $f_N$; $f_N$ to $f_{N+800}$; $f_{N+800}$ . . . ) represents a particular byte (210, 211, 212) of data to be associated with the item (412a, 412b, . . . ), and each reflective tone ($f_{N+5}$, $f_{N+15}$, . . . $f_{N+95}$) of which represents a bit value of the byte, and also selecting a further reflective tone range (such as $f_{N+105}$ . . . ), which represents a checksum reflective tone range. For each item (412a, 412b, . . . ) to which information is to be appended, a reflective tone within each of the selected reflective tone ranges is randomly selected. A checksum of the randomly selected reflective tones is generated for each item (412a, 412b, . . . ) to which information is to be appended. A tag is prepared including reflective elements which are electromagnetically reflective at the selected tones, including the checksum tone. Each tag is associated with the corresponding item (412a, 412b, . . . ) to produce a tagged item (412a, 412b, . . . ). At least the randomly selected reflective tones, the checksum, and their association with the corresponding item (412a, 412b, . . . ) are recorded to thereby produce recorded information. The recorded information is associated with the tagged item (412a, 412b, . . . ), as by shipping the recorded information with a plurality of tagged items (412a, 412b, . . . ).

According to a further aspect of the invention, the tag (10) is illuminated with electromagnetic radiation (418) at least the selected tones, and reflections are received resulting from the illumination. Corresponding bytes of information are generated from the reflections. A checksum in generated from the bytes of information, and the reflected tones and the checksum are compared with the recorded information to thereby identify the tagged item (412a, 412b, . . . ).

According to another aspect of the invention, a method for identifying items (412) within a field comprises the step of associating with each item (412a, 412b, . . . ) a tag (10) carrying a frequency-selective electromagnetically reflective material (12), which reflective material 912) reflects preferentially at at least one reflective tone, within a subband, which subband represents a byte of information relating to the tagged item (412a, 412b, . . . ). Electromagnetic radiation (418) is directed toward the tag at a plurality of frequencies, at least one of which frequencies corresponds with the one frequency, so as to generate reflected electromagnetic energy. The frequency of the reflected electromagnetic energy is compared with a table correlating frequency with information, to determine the byte of information for each of the tags. In a particularly advantageous mode of this aspect of the invention, the step of directing electromagnetic radiation toward the tag includes the step of one of incrementing and decrementing frequency to sequentially direct the plurality of frequencies toward the tag. In a particularly advantageous mode of this aspect of the invention, the step of associating a tag with each item (412a, 412b, . . . ) includes the step of randomizing each of the reflective tones in a known manner. The advantageous mode may further comprise the step of recording the known manner. In another advantageous mode of this aspect of the invention, the step of comparing the frequency of the reflected electromagnetic energy with a table correlating frequency with information includes the step of comparing the frequency of the reflected electromagnetic energy with the recorded information, to extract the byte of information.

What is claimed is:

1. A method for tagging plural items with information related to the items, said method comprising the steps of:

for each item to which information is to be appended, selecting a plurality of reflective tone ranges, each of said tone ranges representing a particular byte of data to be associated with said item, and each reflective tone of which represents a bit value of said byte, and also selecting a further reflective tone range, which represents a checksum reflective tone range;

for each item to which information is to be appended, randomly selecting a reflective tone within each of said selected reflective tone ranges;

for each item to which information is to be appended, generating a first checksum of said randomly selected reflective tones;

preparing a tag including reflective elements which are electromagnetically reflective at said selected tones, including said first checksum tone;

associating said tag with the corresponding item to produce a tagged item;

recording at least said randomly selected reflective tones, said first checksum, and their association with the corresponding item, to produce recorded information; and associating said recorded information with said tagged item.

2. A method according to claim 1, further comprising the steps of:

illuminating said tag with electromagnetic radiation at least said selected tones;

receiving reflections resulting from said illumination and generating the corresponding bytes of information therefrom:

generating a second checksum from said bytes of information; and comparing said reflected tones and said second checksum with said recorded information to thereby identify the tagged item.

3. A method for identifying items within a field, said method comprising the steps of:

associating with each item a tag carrying a frequency-selective electromagnetically reflective material, said reflective material reflecting preferentially at least one reflective frequency, within a subband, which represents a byte of information relating to the tagged item;

directing electromagnetic radiation toward said tag, said electromagnetic radiation comprising at a plurality of frequencies, at least one of which corresponds with said at least one reflective frequency, so as to generate reflected electromagnetic energy;

comparing the at least one reflective frequency of said reflected electromagnetic energy with a table correlating frequency with information, to determine said byte of information for each of said tags.

4. A method according to claim 3, wherein said step of directing toward said tag includes the step of one of incrementing and decrementing frequency to sequentially direct said plurality of frequencies toward said tag.

5. A method according to claim 3, wherein said step of associating with each item a tag includes the step of randomizing each of said at least one reflective frequencies within said subband.

6. A method according to claim 5, further comprising the step of recording said randomized at least one reflective frequencies within said subband.

7. A method according to claim 5, wherein said step of comparing the frequency of said reflected electromagnetic energy with a table correlating frequency with information includes the step of comparing said frequency of said reflected electromagnetic energy with said information, to extract said byte of information.

* * * * *